July 4, 1967 F. H. E. AMOS 3,329,872

BULK-TAPE ERASER

Filed July 13, 1964 2 Sheets-Sheet 1

3,329,872

BULK-TAPE ERASER

Frederick Horace Eric Amos, Weircliffe Court, Exwick, Exeter, England

Filed July 13, 1964, Ser. No. 382,106
Claims priority, application Great Britain, Oct. 15, 1963, 40,618/63
8 Claims. (Cl. 317—157.5)

The present invention relates to a device for erasing, by means of an electromagnet, signals recorded on a magnetic tape.

Magnetic-tape recorders of the domestic and professional type are generally provided with an electro-magnetic erasing head to clean the tape i.e. to erase the signals previously recorded thereon, but in cleaning the tape by this means it is necessary to wind all the tape past the erasing head, which is a time-consuming operation.

Furthermore, tape recorders of the type used in data recording systems and computers are not and cannot be fitted with erase heads for fear that the data contained on the tape may be accidentally erased.

There is, therefore, a need to erase a tape in bulk form, for example, when wound-up in a reel or on a spool or in a cassette, and hereinafter a tape in this form will be referred to as a bulk tape.

Accordingly it is an object of the present invention to provide an eraser for cleaning bulk tape by means of an electromagnet.

To erase a bulk tape by means of an electromagnet, the latter should be of the alternating current type, and it is essential that the bulk tape is withdrawn slowly from the magnetic field, otherwise noise (audible in the form of "hiss") will remain on the tape. It is therefore, advisable to provide means whereby the magnetic field cannot be "collapsed" or discontinued (by breaking the connection of the electromagnet to the supply mains). Consequently, a further object of the present invention is to ensure that the electromagnetic field must be switched on before the bulk tape enters the field, and cannot be switched off before it is removed from the field.

It is also an object of the invention to provide a bulk-tape eraser in which operation of the electromagnet is automatically stopped when the tape is removed from the magnetic field, thus avoiding overheating of the coil of the electromagnet due to unnecessary excitation.

It is also an object of the present invention to provide a bulk-tape eraser which ensures erasure of all widths of tapes commercially available to a level of at least −80 db referred to signal level and thus avoids any need to play back the tape to verify that the signals thereon have been erased.

It is a still further object of the invention to provide a bulk-tape eraser in which saturated tapes or tapes on which electrical signal impulses per se are recorded, may be effectively erased to the same level.

The present invention provides a bulk-tape eraser comprising an electromagnet for creating a magnetic field of sufficient strength to erase any signal recorded on the tape, preferably to a level of at least −80 db referred to signal level, means for rendering the electromagnet operative, means for disposing a bulk-tape in said field so as to enable the tape to be cleaned, and means for rendering the electromagnet inoperative.

The means for rendering the electromagnet operative and the means for rendering it inoperative are preferably constituted by a common switch, and means may be provided for preventing access of the bulk tape to the site of the field until the electromagnet has been rendered operative. Further means may be provided to prevent the electromagnet when operative from being rendered inoperative until the bulk tape has been removed from the field or said first-mentioned means may be such as also to serve this latter purpose.

The electromagnet may be provided with a housing having an aperture to admit a bulk-tape, the aperture being closeable by a gate resiliently biassed to the closed position which on being moved to open the aperture actuates a switch controlling operation of the electromagnet to render the electromagnet operative, and which on the return movement to close the aperture, actuates the switch to render the electromagnet inoperative.

The bulk-tape may be supported in the housing on a shelf to which the aperture gives access and the housing may provide a micro switch operating a light or other indication, to indicate that the bulk-tape has entered the housing a sufficient distance to enable all parts of the bulk-tape to have passed into the magnetic field of the electromagnet. A plurality of such micro switches may be provided to engage tapes of different bulk.

In one embodiment of the invention the bulk-tape is pushed through the aperture into position by finger pressure against a resiliently biassed member so that when the finger pressure is removed the tape is ejected sufficiently to cause it to project out through the aperture and enable it to be gripped by the fingers.

The electromagnet may be built up of laminations of silicon and iron in the shape of an E in which the coil is carried over one outer limb so as to concentrate the flux in a narrow but intense strip, the lamination stack being of sufficient length to substantially equal that of the largest bulk-tape it is intended to be used with and preferably the electromagnet is one operating at 50 or 60 c.p.s. Alternatively, a number of separate magnets may be mounted end to end, so designed that the flux path forms a continuous and uninterrupted barrier, through which the tape must pass. Two such magnets or magnet systems may be used one mounted above the other so that the bulk-tape passes between them.

The invention will now be described, by way of example only, with reference to the accompanying drawings in which.

Figure 1:
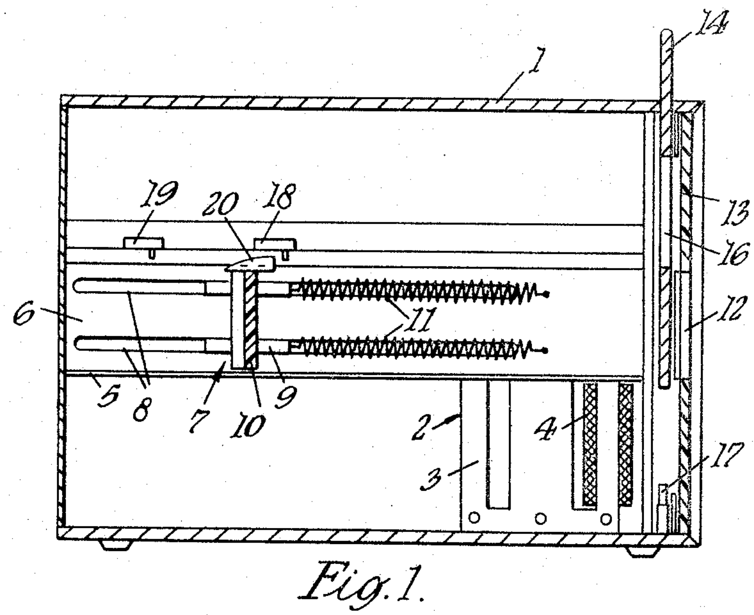
FIGURE 1 is a diagrammatic sketch of a bulk eraser according to the invention shown in a side-elevational section.
Figure 2:
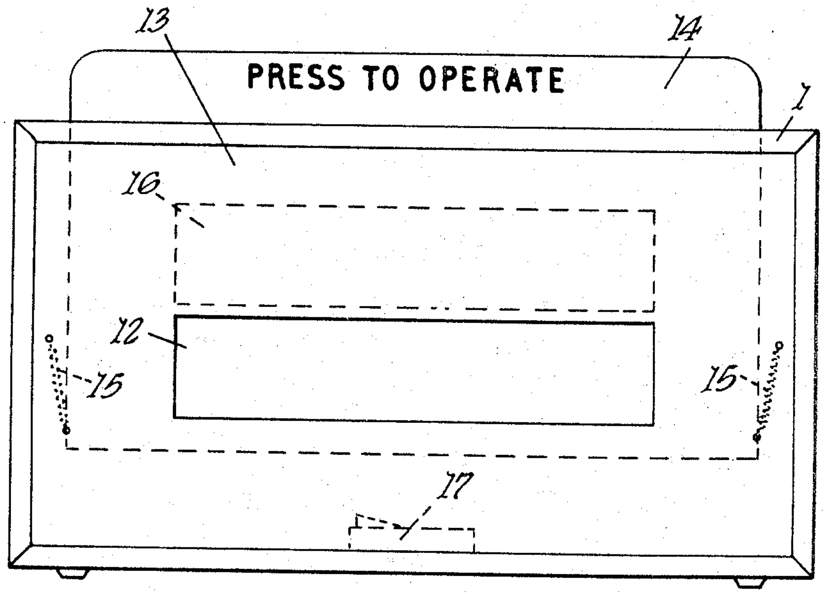
FIGURE 2 is a front elevation of the bulk eraser of FIGURE 1.
Figure 3:
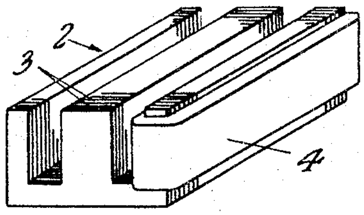
FIGURE 3 is a perspective view of the electromagnet used in the bulk eraser of FIGURE 1.
Figure 4:
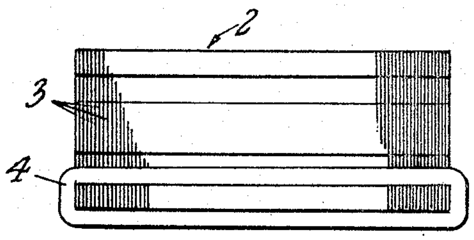
FIGURE 4 is a plan view of the electromagnet of FIGURE 3.

Referring now to FIGURES 1 to 5, the embodiment comprises a substantial wooden cabinet 1, which may be manufactured from mahogany surfaced plywood, having an entrance aperture 12 in a front wall 13, and containing an E-shaped electromagnet 2 operating at 50 c.p.s. which performs the function of erasing the tape. This electromagnet consists of a stack of silicon iron laminations 3 and is of sufficient length to equal the diameter of the largest reel of tape to be erased with a coil 4 having sufficient ampere turns to produce the required magnetic flux placed over the outer limbs of the silicon iron laminations. The electromagnet is mounted centrally in the cabinet, and as near the front as possible, and gives rise to a continuous magnetic field through which the spools of magnetic tape must pass, and in the course of passing through such a field, all matter is erased from the tape.

Figure 5:
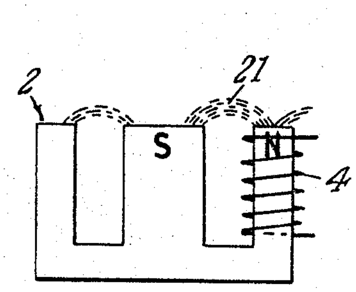
FIGURE 5 is an end-on elevation of the electromagnet of FIGURE 3.
Figure 6:
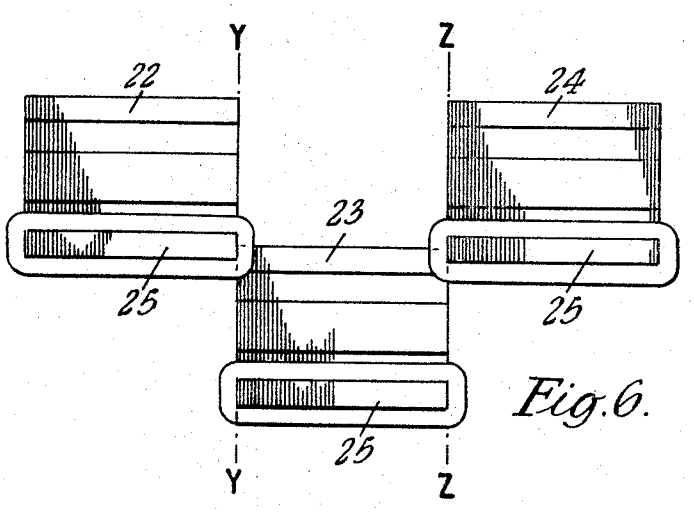
FIGURE 6 is a plan view of an electromagnet system for use in a bulk-tape eraser of the invention.

To the stack of laminations forming the pole piece of the electromagnet is attached e.g. by means of an impact adhesive, a flat sheet 5 not greater than one sixteenth of an inch thick of synthetic resin-bonded paper, which forms a base platform upon which to slide the tape reels. This base platform carries vertical side members 6, fabricated from Perspex or similar material, and locating a reject slide mechanism generally indicated at 7, which by spring tension, assists in ejecting the tape spools after they have passed over the magnet. The side members 6 locate the reject mechanism by slots 8 and the reject mechanism comprises slides 9 running in the slots. To the slides are attached a vertical plate 10 against which the bulk-tape acts. The vertical plate 10 is spring biassed by springs 11, one pair at each side of the cabinet, and each of which is secured at one end to the cabinet wall and at the other end to one of the slides 9, so that the vertical plate resists movement away from the magnet 2 and forces the bulk-tape through the entrance aperture 12 when finger pressure is removed from the bulk-tape, sufficiently to enable the bulk-tape to be gripped by the fingers. The front 13 of the cabinet is enclosed by a panel of Perspex or other material, and the aperture 12 therein is slightly wider than the largest spool to be accommodated, and of a height aproximately twice the depth of the spools. Behind the front panel 13 is located a second panel 14 termed a "gate-switch," moving in slides at each side of the cabinet, its upper edge projecting through an aperture in the top of the cabinet, and normally retained in this position by a coil spring 15 at each side. This sliding panel is also provided with an aperture 16, so that when the portion projecting through the cabinet is depressed against the springs, the apertures in the two panels coincide. In the depressed position, the sliding panel actuates a heavy duty micro-switch 17, controlling the supply mains to the electromagnet. When the gate-switch is in a position which may be termed OFF, with its upper edge projecting through the cabinet, the control switch 17 to the electromagnet is not depressed, and as the two panel apertures do not coincide, it is impossible to pass a spool into the eraser. Upon pressing the projection, however (which may be engraved "PRESS TO OPERATE"), the switch 17 is operated and the panel apertures coincide, so that the bulk-tape may be passed into the eraser. The spool is offered into the eraser by hand, and slid along the base plate until it contacts the vertical plate 10 which may be fabricated from Perspex or moulded from plastic, which travels backwards as the spool is pressed into the eraser by finger pressure. Upon release of this pressure, the reject mechanism forces the spool partially out of the eraser, so that the operator may grip it with his fingers to withdraw it. The present embodiment is constructed to be capable of handling more than one diameter of spool, namely, the four most common size of spools, viz: 5", 5¾", 7" and 8¼", but it will be understood that other embodiments can be constructed on the same principle to handle spools of diameters greater or lesser than the above-mentioned, or to accept magnetic tapes in square or rectangular cassettes instead of spools or even in reels without a supporting spool or cassette. In the case of the present embodiment two miniature micro-switches 18, 19 respectively are located within the eraser, so that the reject mechanism contacts one or other of them by means of a cam 20 carried by the plate 10, according to whether or not the spool is one of the smallest two or one of the largest two diameters, to illuminate a panel light (not shown), when the spool has entered the eraser for a sufficient distance to have passed through the magnetic flux of the electromagnet. The magnet 2 employed consists of a stack of iron and silicon laminations 3, formed into an E-shape with the coil 4 lying around one of the outer limbs of the E so that an intense field 21 is created between the pole formed by this limb and an opposite pole formed by the centre limb as shown in FIGURE 5. The magnet thus provides a narrow but intense strip of magnetic flux through which the bulk-tape must pass and the magnet is such as to provide erasure to a level of —80 db referred to signal level. Alternatively, a plurality of such electromagnets may be used arranged as shown by the magnets 22, 23 and 24 respectively in FIGURE 6, with their pole pieces 25 meeting on the lines Y—Y and Z—Z respectively. The pole pieces 25 may alternatively overlap at these lines. By this means an assembly of greater width can be used than is practicable with a single magnet.

The embodiment described enables complete spools of tape to be cleaned in less than 6 seconds. The tapes are completely cleaned of all matter due to the shape and power of the electromagnet; and due to the design of the gate-switch, the electromagnet is only operative during the time a spool is being inserted and withdrawn (6 seconds) and so does not suffer from the defect of overheating, thus permitting the operator to erase an unlimited number of consecutive spools of tape. The design of the gate-switch also ensures that the magnetic fields is ON before a tape is inserted and cannot be switched OFF before the tape is removed, thereby ensuring a foolproof method of application.

What I claim is:

1. A bulk-tape eraser comprising an electromagnet located in a fixed position in use for erasing signals recorded on the tape, means for rendering the electromagnet operative, means for disposing a bulk-tape in the field created by the electromagnet to cause the tape to be erased of said signals and means for rendering the electromagnet inoperative, wherein the electromagnet comprises a base portion, a plurality of parallel limbs upstanding from said base and a coil wound round one of said limbs other than any one lying between two other limbs and wherein the electromagnet is disposed so that the bulk tape in being passed into the magnetic field necessarily first passes across the limb of the electromagnet carrying the coil.

2. A bulk-tape eraser as set forth in claim 1, wherein said electromagnet is E-shaped with the coil wound round one of the outer parallel limbs.

3. A bulk-tape eraser as set forth in claim 1, wherein the electromagnet is employed in plurality, with the the electromagnets thus provided being mounted end-to-end such that the flux path formed is continuous.

4. A bulk-tape eraser as set forth in claim 1, wherein the electromagnet is employed in a plurality of two and the two electromagnets disposed so that the bulk tape passes between them.

5. A bulk-tape eraser as set forth in claim 1, wherein the electromagnet is employed in plurality and the electromagnets thus provided, disposed so that the bulk tape when being entered into the magnetic field, passes between two sets of electromagnets in each of which sets, the electromagnets are mounted end-to-end such that the flux path formed is continuous.

6. A bulk-tape eraser as set forth in claim 1 wherein the electromagnet is formed of a stack of laminations of silicon and iron.

7. A bulk-tape eraser as set forth in claim 1 wherein the magnetic field created is of a strength to erase to a level of —80 db referred to signal level.

8. A bulk-tape eraser as set forth in claim 1, wherein the electromagnet is provided with a housing having an aperture to admit a bulk-tape, the aperture being closeable by a gate which is resiliently biassed to the closed position and which on being moved to the open position actuates the means for rendering the electromagnet operative and on being moved to the closed position actuates the means for rendering the electromagnet inoperative.

References Cited

UNITED STATES PATENTS

| | | | |
|---|---|---|---|
| 2,733,300 | 1/1956 | Menard ---------- | 179—100.2 |
| 2,766,328 | 10/1956 | Handschin et al. ---- | 179—100.2 |
| 2,848,660 | 8/1958 | Boyers ----------- | 317—157.5 |
| 3,023,280 | 2/1962 | Tronslin et al. ---- | 179—100.2 |

FOREIGN PATENTS

| | | |
|---|---|---|
| 870,846 | 6/1961 | Great Britain. |

MILTON O. HIRSHFIELD, *Primary Examiner.*

J. A. SILVERMAN, *Assistant Examiner.*